United States Patent
Kim et al.

(10) Patent No.: US 12,420,629 B2
(45) Date of Patent: Sep. 23, 2025

(54) DOORLESS FUEL CAP SYSTEM FOR VEHICLE AND CONTROL METHOD THEREOF

(71) Applicants: Hyundai Motor Company, Seoul (KR); Kia Corporation, Seoul (KR)

(72) Inventors: Chang Han Kim, Gwangju (KR); Jun Sik Lim, Bucheon-si (KR); Seung Hoon Choi, Seoul (KR); Gil-eon Kang, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 614 days.

(21) Appl. No.: 17/814,179

(22) Filed: Jul. 21, 2022

(65) Prior Publication Data
US 2023/0052519 A1    Feb. 16, 2023

(30) Foreign Application Priority Data
Aug. 12, 2021   (KR) .................. 10-2021-0106685

(51) Int. Cl.
*B60K 15/04* (2006.01)

(52) U.S. Cl.
CPC .. *B60K 15/0409* (2013.01); *B60K 2015/0416* (2013.01); *B60K 2015/0438* (2013.01); *B60K 2015/0461* (2013.01)

(58) Field of Classification Search
CPC ............... B60K 15/04; B60K 15/0409; B60K 2015/0416; B60K 2015/0438; B60K 2015/0461; B60K 13/05; B60K 15/077; B60K 15/05; B60R 16/033; B60W 30/18054; B60W 40/105
See application file for complete search history.

(56) References Cited

U.S. PATENT DOCUMENTS

| | | | |
|---|---|---|---|
| 3,759,075 A * | 9/1973 | Lipschutz | B60K 15/04 70/159 |
| 5,520,300 A * | 5/1996 | Griffin | B60K 15/0409 220/210 |
| 9,120,431 B2 * | 9/2015 | Takata | B60R 16/02 |
| 2008/0054000 A1 * | 3/2008 | Goldman | F16K 35/10 220/360 |

* cited by examiner

*Primary Examiner* — Syed O Hasan
(74) *Attorney, Agent, or Firm* — Slater Matsil, LLP

(57) ABSTRACT

An embodiment fuel cap system includes a filler neck connected to a fuel pipe, a fuel cap having a cylindrical shape and able to be coupled to the filler neck by rotation, a sliding rod extending from an upper surface of the fuel cap in a shaft direction at an inside of the fuel cap and rotatable together with the fuel cap, a plunger including an upper end slidably coupled to the sliding rod in the shaft direction and a lower end including a coupling rod, and an inner ring on the filler neck and including a catching groove having an interior circumference on which the coupling rod is selectively engaged, wherein a rotation of the fuel cap is prevented when the coupling rod is engaged on the catching groove and the rotation of the fuel cap is possible when the coupling rod is disengaged from the catching groove.

20 Claims, 16 Drawing Sheets

DOORLESS FUEL CAP SYSTEM FOR VEHICLE AND CONTROL METHOD THEREOF

CROSS-REFERENCE TO RELATED APPLICATIONS

This application claims the benefit of Korean Patent Application No. 10-2021-0106685, filed on Aug. 12, 2021, which application is hereby incorporated herein by reference.

TECHNICAL FIELD

The present invention relates to a doorless fuel cap system for a vehicle and a control method thereof.

BACKGROUND

A fuel port is installed in a vehicle to inject a fuel. The fuel port is provided with a fuel door (or an injection door) and a fuel cap (or an injection cap). The fuel cap serves to prevent release of fuel vapors generated inside the fuel tank while preventing a foreign material from flowing into the fuel tank. Although the fuel tank is at a lower position than the fuel port in the vehicle, because of radiant heat from a road surface or a high temperature fuel returned from the engine, as the internal temperature of the fuel tank increases, volatile components among the fuel components evaporate, so the fuel cap is designed to prevent the release of the vapor.

In addition, a fuel door is provided together with the fuel cap to prevent the foreign material inflow into the fuel tank and simultaneously protect the fuel cap. Therefore, the user opens the fuel door and the fuel cap during the refueling process to refuel the vehicle, and after the refueling, the processes are performed in the reverse order.

Some vehicles are not equipped with a fuel door. As an example, a small commercial truck is a typical vehicle type that is not equipped with a fuel door. For vehicles without a fuel door, a key groove is provided in the fuel cap so that the fuel cap may be opened or closed with the vehicle's starting key instead of by way of the fuel door. Therefore, the fuel cap has to be opened and closed each time with the starting key during the refueling process, and in case the user accidentally left the starting key inside the vehicle and exited for the refueling, there was an inconvenience of having to go back to the inside of the vehicle and bring the starting key.

The above information disclosed in this background section is only for enhancement of understanding of the background of the invention, and therefore it may contain information that does not form the prior art that is already known to a person of ordinary skill in the art.

SUMMARY

The present invention relates to a doorless fuel cap system for a vehicle and a control method thereof. Particular embodiments relate to a doorless fuel cap system for a vehicle and a control method thereof, which improves marketability by modifying a structure of the fuel cap so that the fuel cap may be opened or closed without a starting key when fuel is refueled in the vehicle without a fuel door.

An embodiment of the present invention provides a doorless fuel cap system for a vehicle and a control method therefor, in which a structure capable of opening or closing the fuel cap is formed in an internal space of the fuel cap in order to solve problems in the art.

A fuel cap system according to an embodiment of the present invention includes a filler neck connected to a fuel pipe, a fuel cap that has a cylinder shape with an opened lower surface and capable of being coupled to the filler neck by rotation, a sliding rod extending from an upper surface of the fuel cap in a shaft direction at the inside of the fuel cap and capable of being rotated together with the fuel cap, a plunger including an upper end slidably coupled to the sliding rod in the shaft direction and a lower end provided with a coupling rod, and an inner ring provided on the filler neck and including a catching groove on which the coupling rod is selectively caught on an interior circumference, wherein the rotation of the fuel cap is prevented when the coupling rod is caught on the catching groove, and the rotation of the fuel cap is possible when the coupling rod is disengaged from the catching groove.

The fuel cap system according to an embodiment of the present invention may further include a solenoid that separates the coupling rod from the catching groove by applying a force to the plunger in response to application of a current inside the fuel cap.

The fuel cap system according to an embodiment of the present invention may further include an internal guide formed in the shaft direction of the fuel cap to guide movement of the plunger inside the fuel cap.

The fuel cap system according to an embodiment of the present invention may further include an elastic member disposed to surround the exterior circumference of the sliding rod, and the elastic member may provide an elastic force for the coupling rod to be caught on the catching groove.

The fuel cap may include a cap part that is hollow inside so that the solenoid may be press-fitted, and a retainer screwed to the filler neck at the bottom of the fuel cap.

The coupling rod may include a coupling part coupled with the plunger, and a catching part caught on the catching groove.

A protruded part may be formed on the exterior circumference of the sliding rod so that teeth-engagement of the sliding rod and the plunger is enabled, and a coupling groove to which the protruded part is coupled may be formed on the interior circumference of the plunger.

A stopper may be provided inside the retainer to control a range of movement of the plunger.

The interior circumference of the inner ring may form a chamfered structure so that the coupling rod may be easily seated in the catching groove and detached from the catching groove.

To prevent damage to the coupling rod, a gap may be formed between the catching groove and the catching part.

The fuel cap system according to an embodiment of the present invention may further include a controller that controls opening or closing of the fuel cap by a signal input through the refueling button, a speed sensor that detects a speed of the vehicle to be transmitted to the controller so that the controller may determine whether the vehicle is in a stationary state, and a vehicle battery that applies a current to the fuel cap according to a signal from the controller.

A fuel cap system according to an embodiment of the present invention may further include a wire connected to the vehicle battery and the fuel cap to apply a current to the fuel cap.

A control method of a fuel cap system according to another embodiment of the present invention includes determining a state of a vehicle based on a speed of a vehicle detected through a speed sensor by a controller, transmitting a refueling signal to the controller through a refueling button when the vehicle is in a stationary state, applying a current from a vehicle battery to a solenoid inside a fuel cap by the controller, moving a plunger inside the fuel cap in a shaft direction by magnetic force generated by the solenoid in response to application of a current, and moving a coupling rod connected to the plunger and coupled to a filler neck of a fuel pipe together with the plunger and being separated from the filler neck.

The control method of the fuel cap system according to another embodiment of the present invention may further include blocking a current applied to a solenoid through a controller when a stationary state of the vehicle is released.

The control method of the fuel cap system according to another embodiment of the present invention may further include re-coupling a coupling rod with a filler neck while the coupling rod returns to an original position when a current is cut off.

According to an embodiment of the present invention, it is possible to open or close the fuel cap without a starting key even when refueling a vehicle type without a fuel door.

In addition, the fuel cap cannot be opened unless the fueling switch is pressed, and by pressing the fueling switch, the fuel cap is unlocked and the fuel cap is opened, so safety and marketability may be increased.

Further, effects that can be obtained or expected from embodiments of the present invention are directly or suggestively described in the following detailed description. That is, various effects expected from embodiments of the present invention will be described in the following detailed description.

DETAILED DESCRIPTION OF ILLUSTRATIVE EMBODIMENTS

Figure 1:
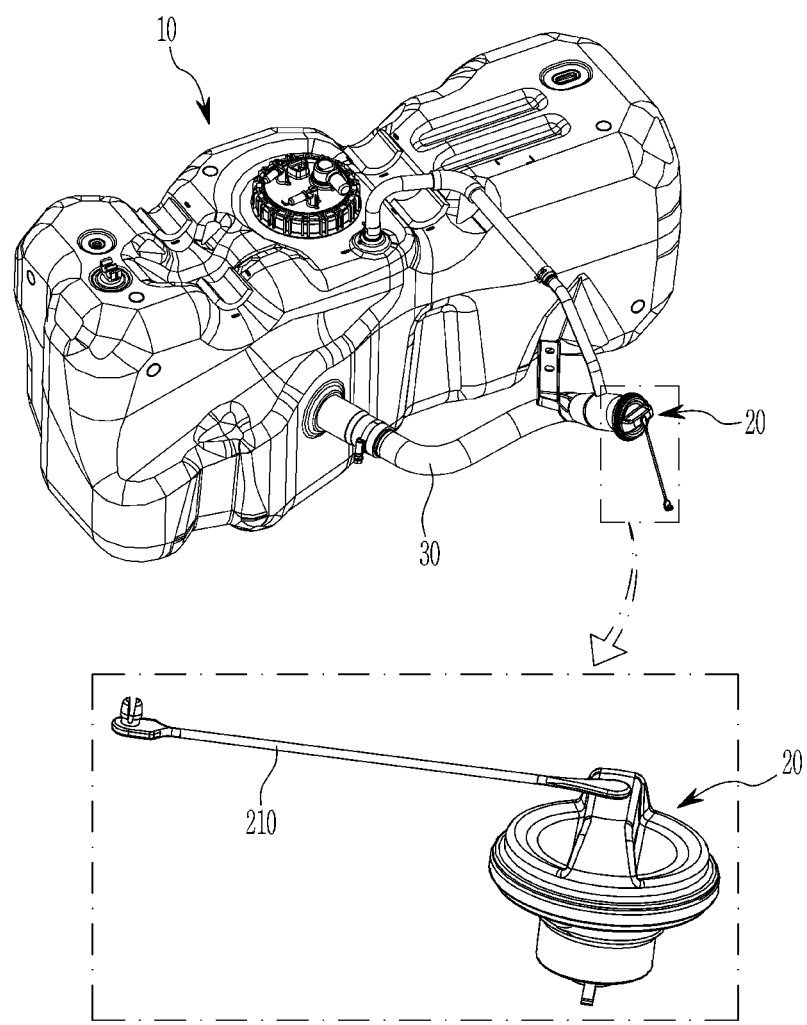
FIG. 1 is a perspective view showing a fuel tank connected to a fuel cap system according to an embodiment of the present invention.

The terms used herein are for the purpose of describing specific embodiments only, and are not intended to limit the present disclosure. As used herein, singular forms are intended to also include plural forms, unless the context clearly indicates otherwise. The terms "comprise" and/or "comprising", when being used in the present specification, specify the presence of the mentioned features, integers, steps, operations, constituent elements, and/or components, but it will also be appreciated that at least the presence or addition of other features, integers, steps, operations, constituent elements, components, and/or groups thereof is not excluded. As used herein, the term "and/or" includes any one or all combinations of the items listed in association therewith.

Hereinafter, referring to the drawings, embodiments of the present invention will be described in detail.

Figure 2:
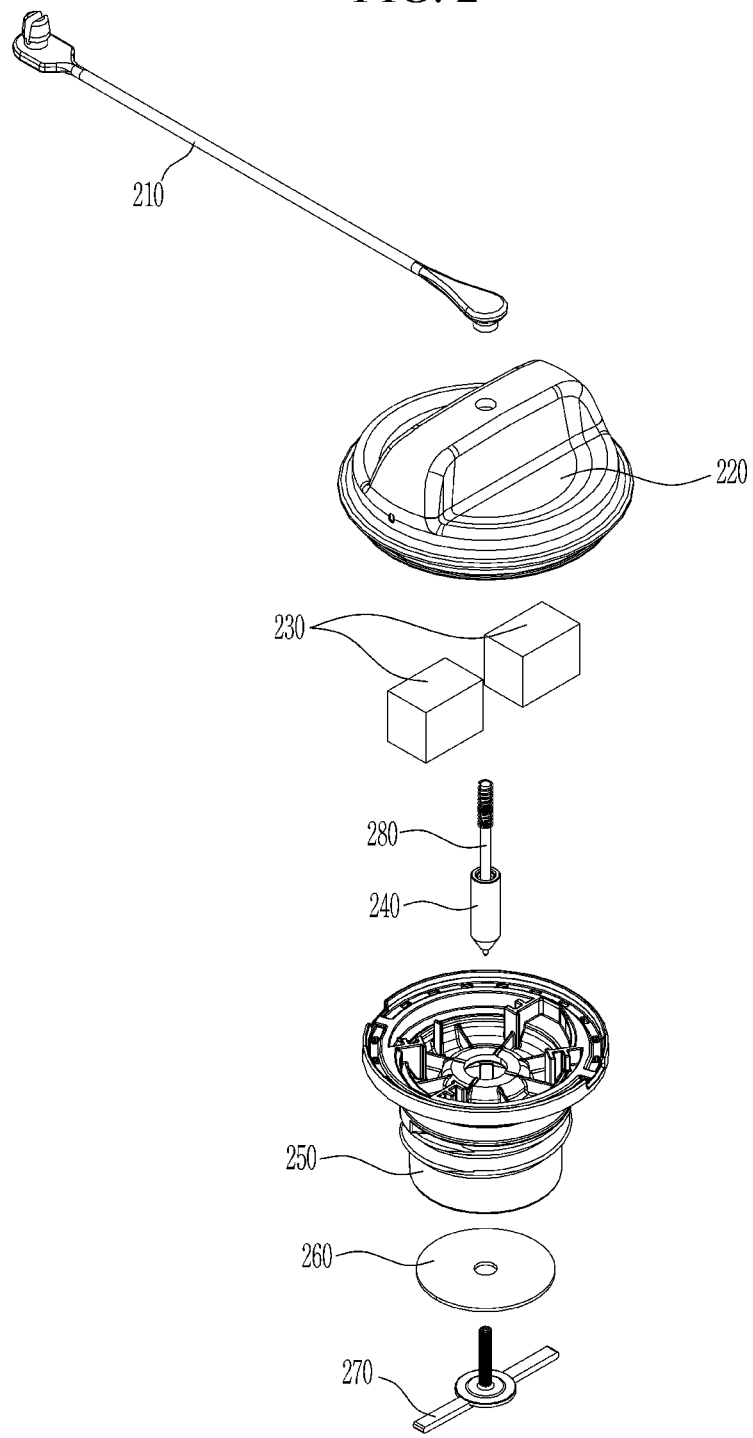
FIG. 2 is an exploded perspective view showing a configuration of a fuel cap according to an embodiment of the present invention.

FIG. 1 is a perspective view showing a fuel tank connected to a fuel cap system according to an embodiment of the present invention, and FIG. 2 is an exploded perspective view showing a configuration of a fuel cap according to an embodiment of the present invention.

As shown in FIG. 1 and FIG. 2, a fuel pipe 30 corresponding to a passage for injecting a fuel into a fuel tank 10 is installed in the fuel tank 10 of the vehicle. One end of the fuel pipe 30 is connected to the fuel tank 10, and the other end is connected to the fuel cap 20.

The fuel cap 20 opens or closes the fuel pipe 30. When the fuel injection is not required, the fuel cap 20 is coupled to the fuel pipe 30 to close the fuel pipe 30, and when the fuel is refueled, the fuel cap 20 is separated from the fuel pipe 30 to open the fuel pipe 30.

Hereinafter, the fuel cap 20 is described in detail.

The fuel cap 20 may include a cap part 220 having an empty interior, and a retainer 250 provided under the cap part 220.

The retainer 250 may form a lower profile of the fuel cap 20. The retainer 250 may be integrally formed with the fuel cap 20, or formed separately from the fuel cap 20 and coupled to the fuel cap 20. The exterior circumference of the retainer 250 may be threaded.

The inside of the fuel cap 20 may be provided with a sliding rod 280 that extends from the lower surface of the cap part 220 downward in the axial direction and is rotatable together with the fuel cap 20. Here, the axial direction may mean a direction in which the fuel pipe 30 extends, that is, a length direction of a filler neck 300.

Inside the fuel cap 20, a plunger 240 may be disposed. The plunger 240 may be slidably coupled to the sliding rod 280 in the axial direction and may rotate together with the plunger 240.

As an example, in order to implement sliding coupling in which the sliding rod 280 is introduced into the interior of the plunger 240, the plunger 240 may have an opened upper portion and may be formed with an empty cylindrical shape. In another example, the sliding rod 280 has an opened lower portion and has a hollow cylindrical shape, and the upper portion of the plunger 24 may be inserted into the sliding rod 280.

The lower portion of the plunger 240 may be coupled to the coupling rod 270. Accordingly, the coupling rod 270 is movable together with the plunger 240. As an example, the coupling rod 270 is integrally formed with the plunger 240 to operate as a single part.

A stopper 260 may be provided inside the retainer 250 to control the movement range of the plunger 240. As an example, the stopper 260 may have a disk shape with a hollow formed in the center. The plunger 240 and the coupling rod 270 may be coupled through the hollow. Based on the stopper 260, the plunger 240 may be positioned on one side (e.g., an upper side) in the shaft direction, and the coupling rod 270 may be positioned on the other side (e.g., a lower side) in the shaft direction. The diameter of the plunger 240 may be larger than the hollow, and the diameter of the coupling part 271 of the coupling rod 270 may be smaller than the hollow.

Accordingly, when the plunger 240 moves to one side (e.g., the upper side) in the shaft direction of the fuel cap 20, the coupling rod 270 moving together with the plunger 240 may freely pass through the hollow of the stopper 260. However, when the plunger 240 moves to the other side (e.g., the lower side) of the fuel cap 20 in the shaft direction, the lower end of the plunger 240 does not pass through the hollow and is caught, so excessive movement of the plunger 240 to the other side in the shaft direction may be controlled.

A solenoid 230 for moving the coupling rod 270 by applying a force to the plunger 240 in response to application of a current may be provided inside the fuel cap 20. A closed loop-shaped conductor made of a metal wire is called a coil, and a long cylinder in which the coil is uniformly wound is called a solenoid 230. The solenoid 230 may be press-fitted into the cap pall 220 with an empty interior.

The driving principle of the solenoid 230 and the moving process of the coupling rod 270 are described later. The plunger 240, the solenoid 230, and the coupling rod 270 of the fuel cap 20 may be defined as a most basic solenoid system.

In addition, an internal guide 221 for guiding the movement of the plunger 240 may be formed inside the cap pall 220 of the fuel cap 20. The internal guide 221 may be integrally formed with the cap pall 220 of the fuel cap 20. The internal guide 221 may be formed to extend along the shaft direction of the fuel cap 20 so that the plunger 240, which moves the center of the solenoid 230 in the shaft direction, may move smoothly.

Figure 3:
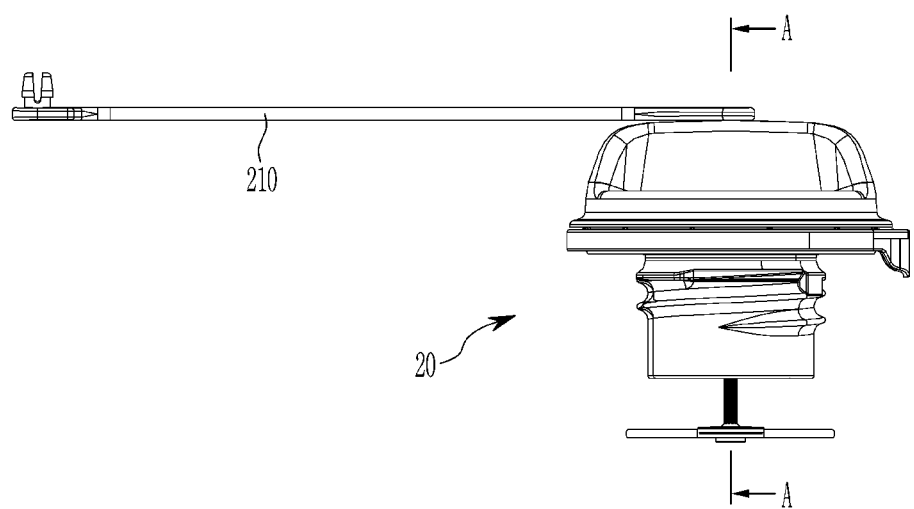
FIG. 3 is a view showing an assembled fuel cap according to an embodiment of the present invention.
Figure 4:
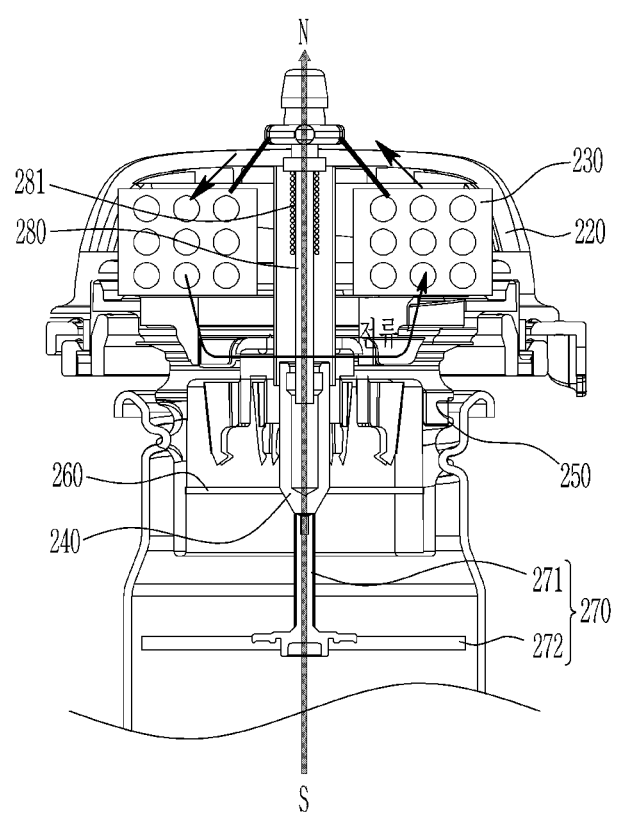
FIG. 4 is a cross-sectional view of a direction A-A of FIG. 3.
Figure 5:
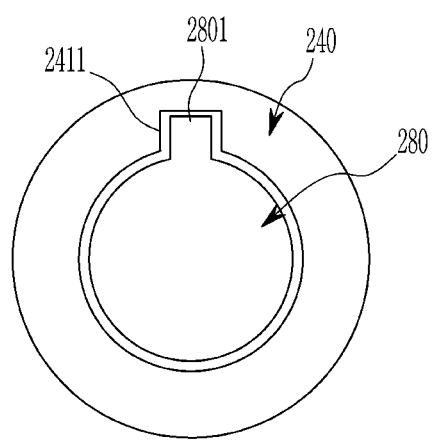
FIG. 5 is a view showing a configuration of a plunger and a sliding rod according to an embodiment of the present invention.

FIG. 3 is a view showing an assembled fuel cap according to an embodiment of the present invention, FIG. 4 is a cross-sectional view of a direction A-A of FIG. 3, and FIG. 5 is a view showing a configuration of a plunger and a sliding rod according to an embodiment of the present invention.

Referring to FIG. 3 to FIG. 5, it may be seen that the space inside the fuel cap 20 may be reused to form a structure in which the current may be applied to the inner space. Referring to FIG. 4, the cylinder-shaped solenoid 230 is provided inside the fuel cap 20 so that the shaft direction coincides with the shaft direction of the fuel cap 20. The solenoid 230 is magnetized by receiving the current and converts electrical energy into magnetic energy. The method of applying the current to the solenoid 230 is described in detail later.

According to Ampere's right-hand rule, when the current flows inside the solenoid 230 in an anticlockwise direction with reference to FIG. 4, a magnetic flux is formed in one side (e.g., the upper side) of the shaft direction of the fuel cap 20. When the current flows inside the solenoid 230 in a clockwise direction, the magnetic flux (the magnetic field) is formed in the other side (e.g., the lower side) of the shaft direction. Here, the direction in which the magnetic flux (the magnetic field) exits corresponds to an N pole of a magnet. Also, a magnetic force is generated in the direction of the magnetic flux.

Particularly, referring to FIG. 4, in a case of an embodiment of the present invention, the current may flow inside the solenoid 230 in an anticlockwise direction. In addition, the plunger 240 may be a metal material that may be affected by a magnetic field. However, the type of the metal is not limited.

As an example, when the current flows inside the solenoid 230 in an anticlockwise direction, the plunger 240 receives the force to one side of the shaft direction of the fuel cap 20 corresponding to the N pole and moves upwards.

Inside the fuel cap 20, an elastic member 281 disposed to surround the exterior circumference of the sliding rod 280 may be further included. As an example, in the case of the fuel cap 20 in which the internal guide 221 is formed, the elastic member 281 may be disposed on the inside of the internal guide 221 (see FIG. 2). The elastic member 281 may correspond to a spring that surrounds the exterior circumference of the sliding rod 280 and is seated on the sliding rod 280, but the type is not particularly limited. The elastic member 281 may be implemented as a compression coil spring. The elastic member 281 provides an elastic force to the coupling rod 270 downward in the shaft direction of the fuel cap 20. That is, it is useful to help the downward movement of the plunger 240 coupled with the coupling rod 270.

As an example, if the plunger 240, which has a groove in the upper part, moves to one side (e.g., the upper side) of the shaft direction of the fuel cap 20, the sliding rod 280 is inserted into the groove of the plunger 240, and the elastic member 281, which has a larger diameter than the diameter of the groove and surrounds the exterior circumference of the sliding rod 280, does not enter the groove of the plunger 240 and is compressed while being caught on the upper end of the plunger 240. When the movement of the plunger 240 finishes moving to one side of the shaft direction, the elastic member 281 maintains a compressed state.

Next, when the magnetic field of the solenoid 230 is extinguished and the plunger 240, which receives no force, moves in the opposite direction of the shaft direction by gravity and returns to its original position, the plunger 240 is pushed to the other side (e.g., the lower side) of the shaft direction by the elastic force of the elastic member 281, and the plunger 240 may be smoothly returned to its original position.

Referring to FIG. 5, the sliding rod 280 and the plunger 240 rotate together, and simultaneously the sliding rod 280 and the plunger 240 may be teeth-engaged with each other in a direction vertical to the shaft direction to be slide-coupled in the shaft direction. As an example, a protruded part 2801 may be formed on the exterior circumference of the sliding rod 280, and a coupling groove 2411 in which the protruded part is coupled may be formed on the interior circumference of the plunger 240. Of course, the protruded part 2801 and the coupling groove 2411 may be formed in a plurality.

Because the protruded part 2801 and the coupling groove 2411 are teeth-engaged in the direction vertical to the shaft direction of the fuel cap 20, the plunger 240 may freely move without restriction in the shaft direction, while when the sliding rod 280 coupled to the fuel cap 20 rotates together by the rotation of the fuel cap 20, the plunger 240 coupled with the sliding rod 280 by the teeth-engagement may also be rotated together.

The method of assembling the fuel cap 20 corresponding to an embodiment of the present invention is as follows.

First, the solenoid 230 is press-fitted into the cap part 220 of the fuel cap 20. After that, the sliding rod 280 and the plunger 240 are assembled inside the cap part 220. As an example, when the internal guide 221 is formed inside the cap part 220, the sliding rod 280 and the plunger 240 may be assembled inside the internal guide 221. At this time, the elastic member 281 may be installed on the exterior circumference of the sliding rod 280.

The plunger 240 and the sliding rod 280, and the plunger 240 and the coupling rod 270, should be assembled so that the coupling rod 270 may also be rotated according to the rotation of the plunger 240. Therefore, the sliding rod 280 and the plunger 240 are teeth-engaged in the direction vertical to the shaft direction. After that, the plunger 240 and the coupling rod 270 are coupled. Of course, the order of the coupling process of the sliding rod 280 and the plunger 240 and the coupling process of the plunger 240 and the coupling rod 270 may be changed.

A step of providing a stopper 290 between the plunger 240 and the coupling rod 270 may be added to the assembly method. In addition, the method may further include a step of assembling the retainer 250 directly coupled to the filler neck 300 (see FIG. 6) under the fuel cap 20.

Figure 6:
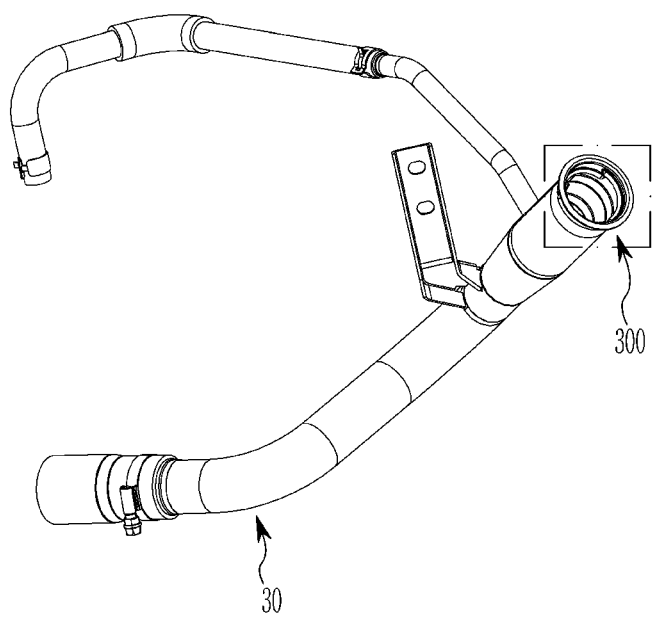
FIG. 6 is a perspective view showing a combination of a fuel pipe and a filler neck according to an embodiment of the present invention.
Figure 7:
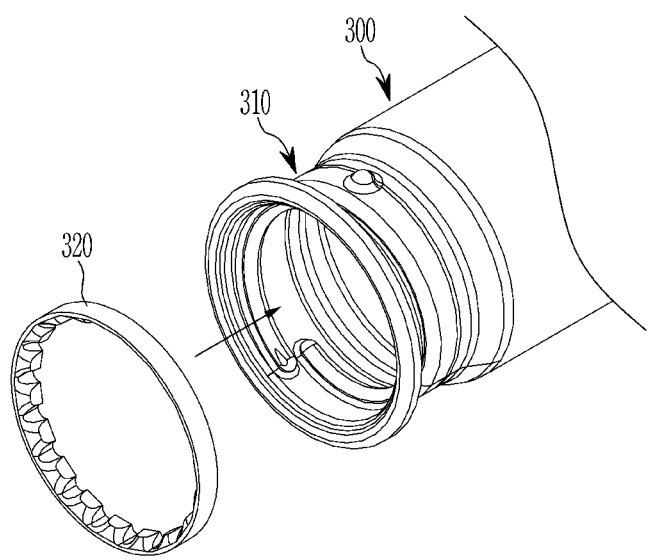
FIG. 7 is a partial perspective view showing a process in which an inner ring is inserted into a filler neck according to an embodiment of the present invention.
Figure 8:
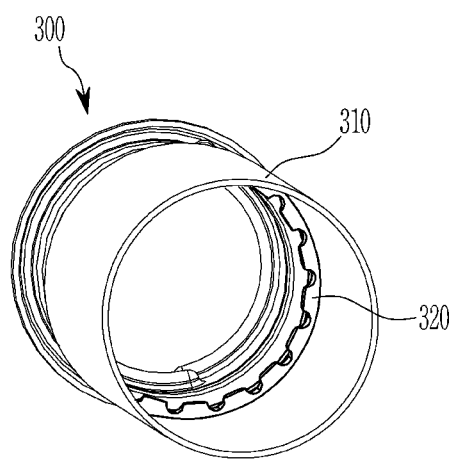
FIG. 8 is a perspective view showing a combination of an inner ring inside a filler neck according to an embodiment of the present invention.
Figure 9:
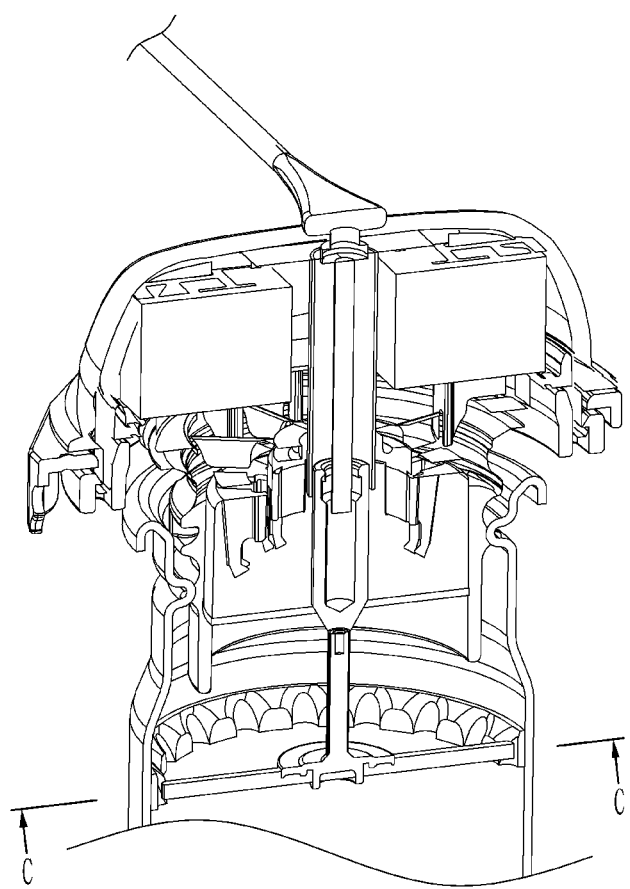
FIG. 9 is a cross-sectional view showing an interior view in which a fuel cap and a filler neck are combined according to an embodiment of the present invention.

FIG. 6 is a perspective view showing a combination of a fuel pipe and a filler neck according to an embodiment of the present invention. FIG. 7 is a partial perspective view showing a process in which an inner ring is inserted into a filler neck according to an embodiment of the present invention, FIG. 8 is a perspective view showing a combination of an inner ring inside a filler neck according to an embodiment of the present invention, and FIG. 9 is a cross-sectional view showing an interior view in which a fuel cap and a filler neck are combined according to an embodiment of the present invention.

Referring to FIG. 6 to FIG. 9, a filler neck 300 may be provided at the other end of the fuel pipe 30. The filler neck 300 may be integrally formed with the fuel pipe 30 to configure a part of the fuel pipe 30, or may be formed as a separate part from the fuel pipe 30 and coupled to the other end of the fuel pipe 30. The filler neck 300 may be provided at the other end of the fuel pipe 30 and be combined with the fuel cap 20.

As an example, the fuel cap 20 may be coupled to the filler neck 300 by rotation. For this, the fuel cap 20 and the filler neck 300 may be screwed together. As an example, threads corresponding to each other may be formed on the exterior circumference or the interior circumference of the fuel cap 20 and the interior circumference or the exterior circumference of the filler neck 300, respectively.

An inner ring 320 capable of being combined with the coupling rod 270 may be provided inside the filler neck 300. The inner ring 320 may be positioned on the inner side of the filler neck 300 from the position at which the front part 310 is formed in the filler neck 300. As an example, referring to the process of inserting the inner ring 320 into the filler neck 300, since the front part 310 has a smaller diameter than the inner ring 320, the front part 310 may be machined after inserting the inner ring 320 into the filler neck 300.

Referring to FIG. 9, the filler neck 300 and the fuel cap 20 may be combined by the inner ring 320.

Figure 10:
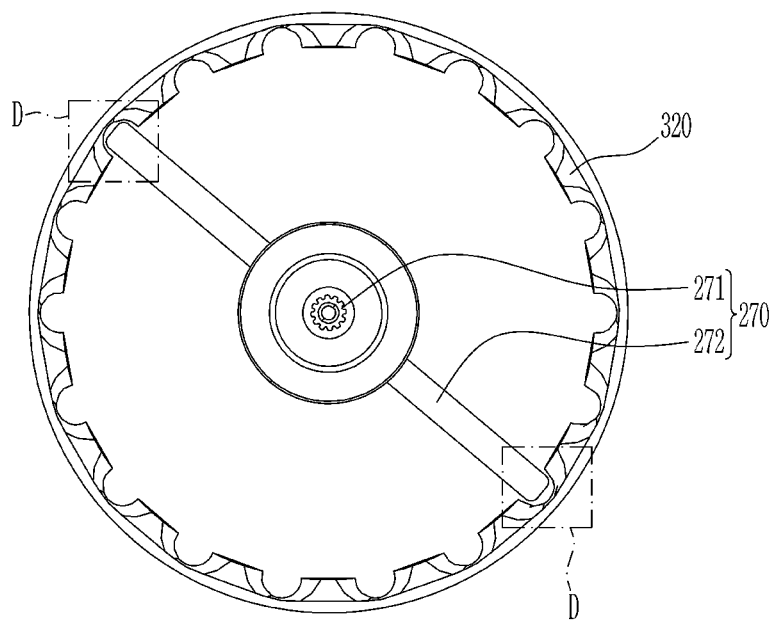
FIG. 10 is a cross-sectional view in a direction C-C of FIG. 9.
Figure 11:
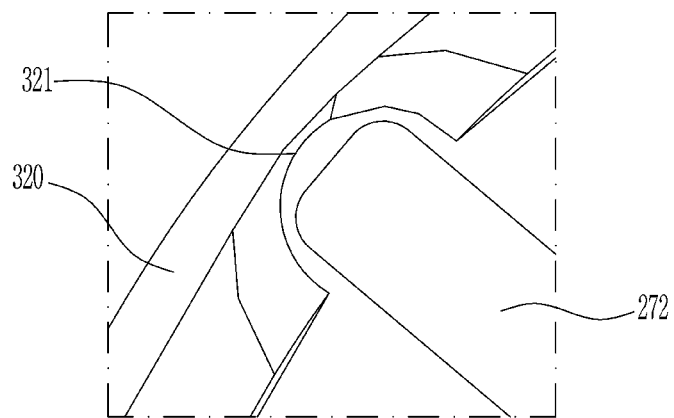
FIG. 11 is an enlarged view of an area 'D' of FIG. 10.
Figure 12:
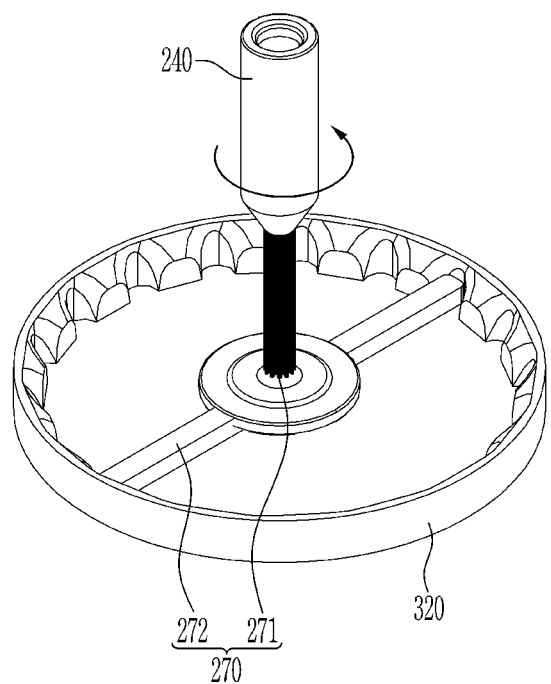
FIG. 12 is a view showing a structure in which a rotation of a coupling rod is impossible in a closed state of a fuel cap system according to an embodiment of the present invention.
Figure 13:
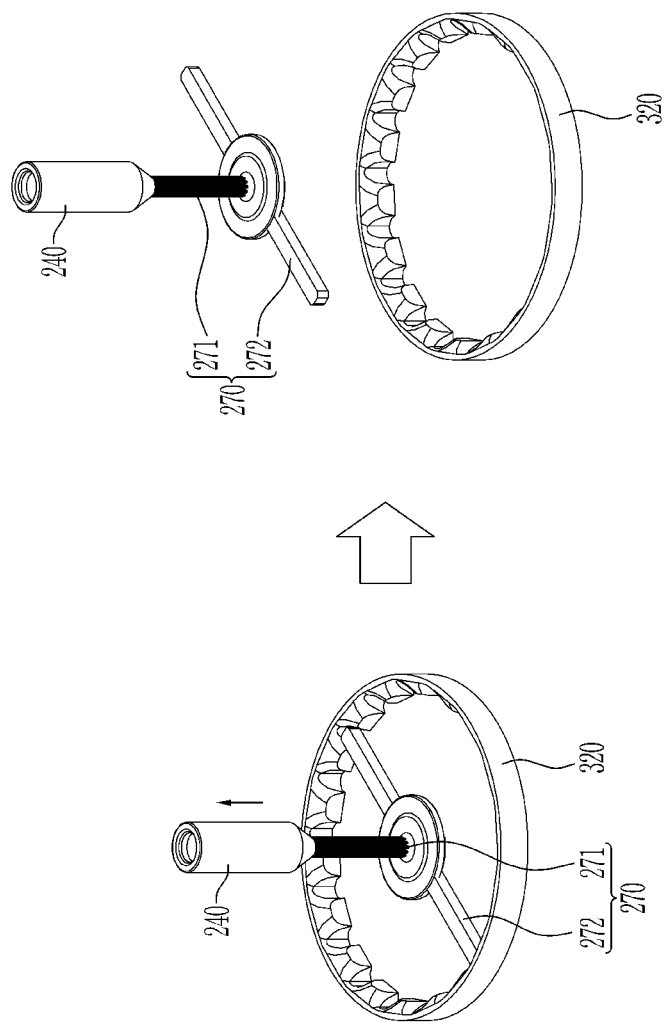
FIG. 13 is a view showing a process in which a coupling rod according to an embodiment of the present invention is separated from an inner ring.
Figure 14:
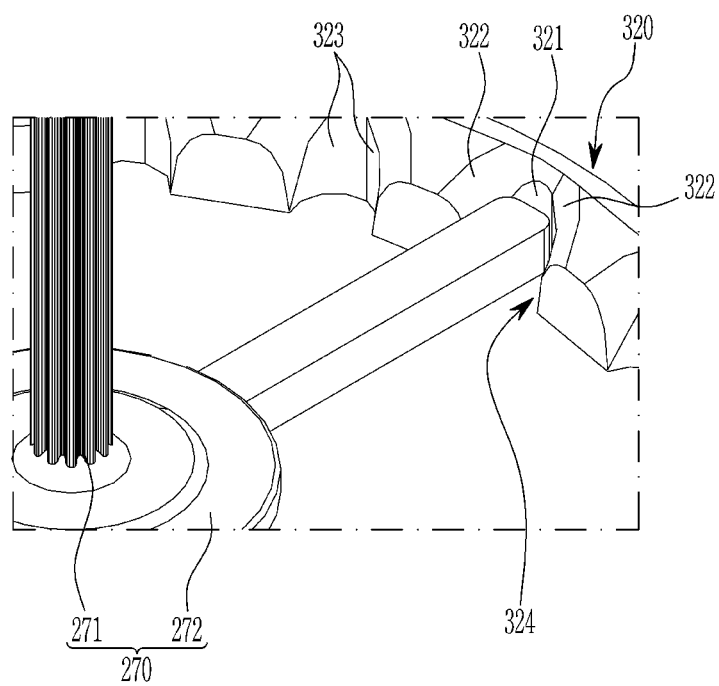
FIG. 14 is a partial perspective view that enlarges a detailed configuration of an inner ring according to an embodiment of the present invention.

FIG. 10 is a cross-sectional view in a direction C-C of FIG. 9, FIG. 11 is an enlarged view of an area 'D' of FIG. 10, FIG. 12 is a view showing a structure in which a rotation of a coupling rod is impossible in a closed state of a fuel cap system according to an embodiment of the present invention, FIG. 13 is a view showing a process in which a coupling rod according to an embodiment of the present invention is separated from an inner ring, and FIG. 14 is a partial perspective view that enlarges a detailed configuration of an inner ring according to an embodiment of the present invention.

Referring to FIG. 10 to FIG. 14, when the coupling rod 270 is seated and fixed on the inner ring 320, the axial direction rotation of the fuel cap 20 by an external force is prevented, and when the coupling rod 270 is separated from the inner ring 320, the axial direction rotation of the fuel cap 20 becomes possible.

Referring to FIG. 10, the coupling rod 270 may include a coupling part 271 coupled to the plunger 240 and a catching part 272 caught on the inner ring 320.

Referring to FIG. 11, at least a pair of catching grooves 321 formed to be concave in the radial direction may be formed on the interior circumference of the inner ring 320. Since the length from the center of the inner ring 320 to the radial direction end of the catching groove 321 is equal to or greater than the length of the catching part 272 of the coupling rod 270, the catching part 272 of the coupling rod 270 may be seated on the catching groove 321.

As an example, a gap may be formed between the catching part 272 and the catching groove 321 by forming the length from the center of the inner ring 320 to the radial direction end of the catching groove 321 to be larger than the length of the catching part 272. Due to this, the catching part 272 may be smoothly seated in the catching groove 321.

Also, a gap 324 may be formed in the width direction of the catching part 272 and the catching groove 321 (or the circumferential direction of the inner ring). When the fuel cap 20 is combined with the filler neck 300 and the plunger 240 is rotated by an external force in the state that the fuel pipe 30 is closed, if there is no gap between the catching part 272 and the catching groove 321, the coupling part of the coupling part 271 and the catching part 272 or the catching part 272 and the catching groove 321 may be damaged by the impact of the external force.

However, when the gap 324 is formed, as the coupling rod 270 may rotate by a predetermined angle, the rotation is possible only within the range of the gap 324 of the catching groove 321 and the catching part 272, it is possible to reduce the impact caused by the external force on the coupling part of the coupling part 271 and the catching part 272 and reduce the risk of breakage of the catching part 272 and the catching groove 321. In addition, since the rotation is no longer possible beyond the gap range, reckless rotation of the fuel cap 20 may be prevented.

Referring to FIG. 12 to FIG. 14, on the interior circumference of the inner ring 320, a chamfered structure may be formed so that the catching part 272 of the coupling rod 270 may be easily seated in the catching groove 321 and be easily separated from the catching groove 321.

As an example, on the interior circumference and the upper surface of the inner ring 32, if the coupling rod 270 moves to the other side (e.g., the lower side) in the shaft direction, a first rounded processed part 322 may be formed so as to be seated smoothly in the catching groove 321. The first rounded processed part 322 may be processed into a rounded shape. When the coupling rod 270 moves to the other side (e.g., the lower side) of the fuel cap 20 in the shaft direction, even if the catching part 272 of the coupling rod 270 and the shaft direction position of the catching groove 321 do not exactly match, the catching part 272 may ride the rounded shape of the first rounded processed part 322 and slide in the direction in which the catching groove 321 is formed to be seated in the catching groove 321.

In addition, a second rounded processed part 323 may be formed inside the catching groove 321 so that the catching part 272 of the coupling rod 270 is easily separated from the catching groove 321 when the coupling rod 270 moves to one side (e.g., the upper side) of the shaft direction. As an example, the second rounded processed part 323 is also processed into a rounded shape so that the catching part 272 rides on the surface of the second rounded processed part 323 and is easily separated from the catching groove 321.

As an example, when a plurality of catching grooves 321 are formed in the inner ring 32, since the catching grooves 321 are formed at a predetermined interval over the entire interior circumference of the inner ring 320, the coupling rod 270 may be easily seated in the catching groove 321. Accordingly, it is possible to prevent accidents that may occur due to the coupling rod 270 not being securely seated on the inner ring 320.

Overall, when the coupling rod 270 moves to one side (e.g., an upper side) of the shaft direction of the fuel cap 20 along the plunger 240, since the catching part 272 is separated from the inner ring 320, the rotation of the fuel cap 20 is possible, and accordingly, it may be detached from the filler neck 300. As an example, in the case of the fuel cap 20 equipped with the retainer 250, screw coupling between the retainer 250 and the filler neck 300 may be released. Therefore, the fuel pipe 30 opens and reaches a state where the refueling is possible.

Conversely, when the fuel pipe 30 is closed after the refueling, the fuel cap 20 may be rotationally coupled to the filler neck 300. As an example, in the case of the fuel cap 20 equipped with the retainer 250, the retainer 250 and the filler neck 300 may be screwed and coupled. At this time, the coupling rod 270 moves toward the ground corresponding to the other side of the shaft direction along the plunger 240 and returns to its original position. Therefore, the catching part 272 is seated again on the inner ring 320. Accordingly, the fuel pipe 30 is in a closed state.

As an example, even when the radial length of the catching part 272 is equal to or shorter than the length from the center of the inner ring 320 to the innermost part of the catching groove 321, it may prevent additional movement in the other side of the shaft direction from the position where the inner ring 320 is formed inside the filler neck 300. Since the catching part 272 is not separated from the inner ring 320, the catching part 272 is maintained in a state where the rotation is impossible based on the shaft direction by the catching groove 321.

Next, a configuration for controlling the fuel cap system according to an embodiment of the present invention and a control method according thereto are described in detail.

Figure 15:
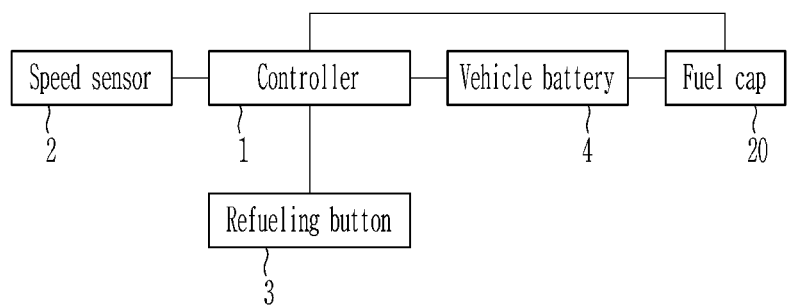
FIG. 15 is a block diagram of a fuel cap system according to an embodiment of the present invention.
Figure 16:
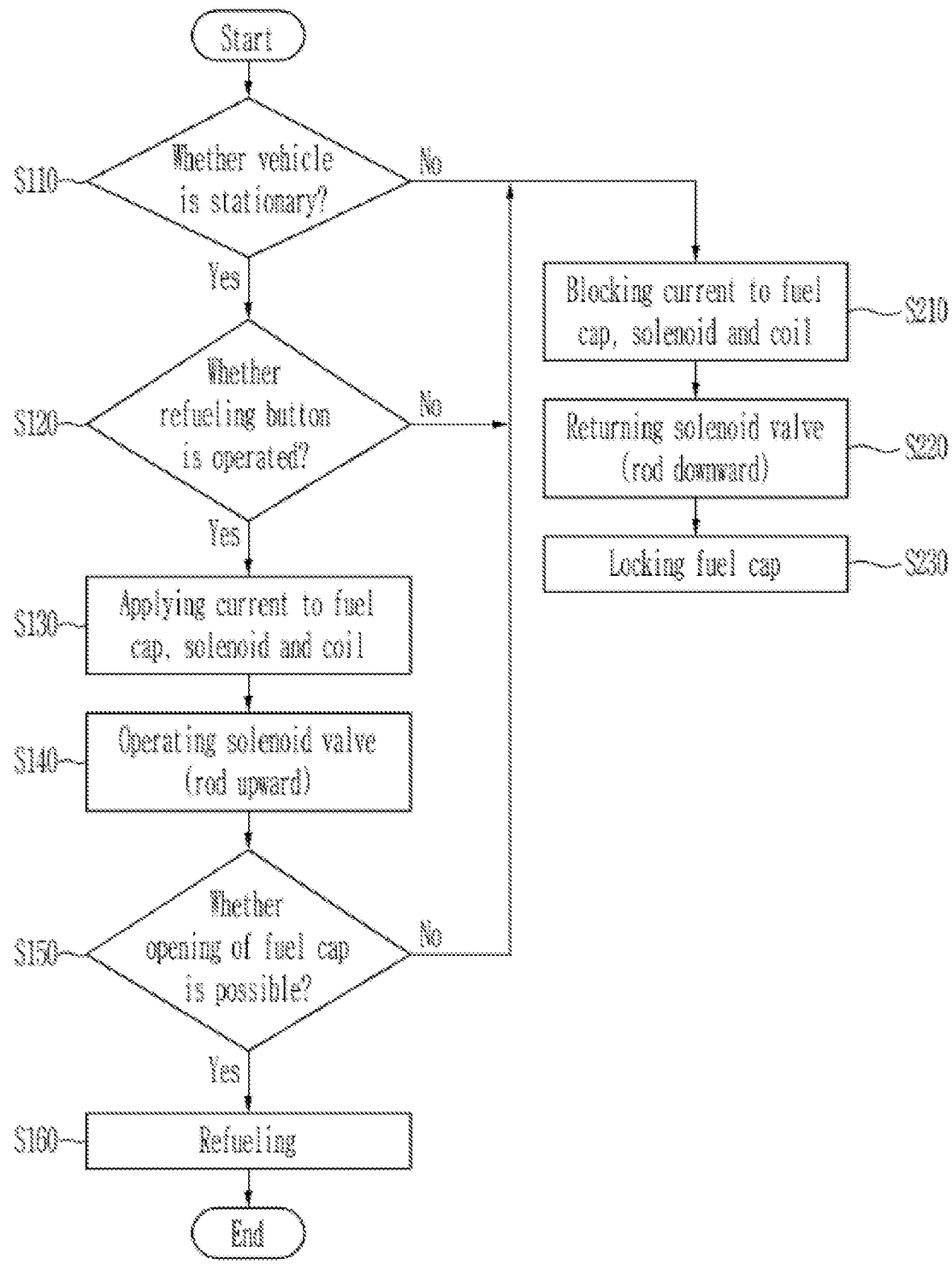
FIG. 16 is a flowchart of a control method of a fuel cap system according to an embodiment of the present invention.

FIG. 15 is a block diagram of a fuel cap system according to an embodiment of the present invention, and FIG. 16 is a flowchart of a control method of a fuel cap system according to an embodiment of the present invention.

First, the configuration of the fuel cap system is described. The fuel cap system according to an embodiment of the present invention may include a controller 1, a speed sensor 2, a refueling button 3, and a vehicle battery 4. The controller 1 controls the opening or closing of the fuel cap 20 according to the refueling signal input through the refueling button 3. As an example, the controller 1 may correspond to an electronic control unit (ECU). The electronic control unit (ECU) refers to a device that controls various components of a vehicle with a computer. The electronic control unit (ECU) maintains the various functions of the vehicle in an optimal state.

The speed sensor 2 detects the current vehicle speed and transmits it to the controller 1. The controller 1 may determine whether the vehicle is in a stationary state based on the speed of the vehicle detected by the speed sensor 2. The controller 1 may control the opening/closing of the fuel cap 20 through the current supplied through the vehicle battery 4. Therefore, the controller 1 may apply current to the fuel cap 20 or block the current from being applied by using the vehicle battery 4.

The vehicle battery 4 may be additionally installed with a wire 210 electrically connected to the fuel cap 20 (see FIG. 3). As an example, the wire 210 may be connected to the cap part 220 surface of the fuel cap 20. The wire 210 performs two roles in the fuel cap system according to an embodiment of the present invention. The first role of the wire 210 is as a wire supplying the current into the fuel cap 20 as described above. The second role of the wire 210 is to prevent loss of the fuel cap 20. Since the wire 210 connected to the fuel cap 20 is connected to the vehicle battery 4, that is, is broadly connected to the vehicle body, when the fuel cap 20 is separated from the filler neck 300 for the refueling, the state that the fuel cap 20 is connected to the vehicle by the wire 210 is maintained. Therefore, the user may refuel the vehicle without the need to store the fuel cap 20 in a separate space, thereby preventing the fuel cap 20 from being lost.

Next, the operation of the fuel cap control system is described in detail.

In order for the user to refuel the vehicle, the vehicle must first be in a stationary state. That is, the controller 1 must determine whether the vehicle is in a stationary state. Because the opening/closing of the fuel cap 20 is controlled by the controller 1, when the vehicle is running, the fuel cap 20 is always kept locked.

To this end, the speed of the vehicle measured from the speed sensor 2 that measures the speed of the vehicle is transmitted to the controller 1, and the controller 1 determines whether the vehicle is in a stationary state (S110).

If the vehicle is not in a stationary state, the current is not applied to the fuel cap 20, and even if the current is supplied to the fuel cap 20 due to a malfunction, the current supplied to the fuel cap 20 is cut off (S210) by the controller 1, and if necessary, an emergency switch for selectively blocking the current supplied to the fuel cap 20 from the battery and operated by the controller may be provided on the wire 210. Accordingly, the plunger 240 of the solenoid valve and the coupling rod 270 may not move in the shaft direction of the fuel cap 20, and even if it is in the moving state, the current is blocked and the solenoid 230 does not receive a magnetic force in the shaft direction. Accordingly, the plunger 240 and the coupling rod 270 return to their original positions by gravity (S220), and the fuel cap 20 maintains the locked state (S230).

When the vehicle is in a stationary state and the user operates the refueling button 3 when the user wants to refuel, the refueling signal from the refueling button 3 is transmitted to the controller 1. Through this, the controller 1 determines whether the refueling button 3 is operated (S120). Similarly, if the user does not press the refueling button 3, no current is applied to the fuel cap 20 as well. When the refueling signal is transmitted to the controller 1 according to the operation of the refueling button 3, the controller 1 applies a current from the vehicle battery 4 to the solenoid 230 inside the fuel cap 20 (S130).

When the current is supplied to the solenoid 230 from the vehicle battery 4, the plunger 240 moves upward in the axial direction by the magnetic force generated in the shaft direction by the solenoid 230, and the coupling rod 270 coupled with the plunger 240 moves together therewith (S140). Accordingly, the coupling rod 270 coupled to the filler neck 300 is separated from the filler neck 300, and the fuel cap 20 may be opened (S150). When the fuel cap 20 is opened, the user refuels the vehicle's fuel tank (S160).

When the fuel cap 20 itself is damaged, or there is a problem with the fuel cap system, or when the stationary state of the vehicle is released in at least one of the steps (S120 to S150), the current supplied to the fuel cap 20 is cut off. To this end, the above-described steps (S210 to S230) are sequentially performed.

The fuel cap system according to an embodiment of the present invention may open and close the fuel cap without a starting key during the fueling condition of the vehicle and apply the power to the solenoid provided inside the fuel cap to control the open and closed state of the fuel cap, thereby the vehicle safety and commercialization may be improved.

While this invention has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

What is claimed is:

1. A fuel cap system comprising:
    a filler neck connected to a fuel pipe;
    a fuel cap having a cylindrical shape with an opened lower surface and configured to be coupled to the filler neck by rotation;
    a controller configured to control opening or closing of the fuel cap by a signal input through a refueling button;
    a speed sensor, wherein the controller is configured to determine whether a vehicle is in a stationary state based on a speed detected by the speed sensor;
    a vehicle battery;
    a wire coupling the vehicle battery with the fuel cap, the vehicle battery applying a current to the fuel cap through the wire according to the signal from the controller;
    a sliding rod extending from an upper surface of the fuel cap in a shaft direction at an inside of the fuel cap and configured to rotate together with the fuel cap;
    a plunger comprising an upper end slidably coupled to the sliding rod in the shaft direction and a lower end comprising a coupling rod;
    an inner ring provided on the filler neck and comprising a catching groove having an interior circumference on which the coupling rod is configured to be selectively engaged; and
    a solenoid configured to separate the coupling rod from the catching groove by applying a force to the plunger in response to application of the current inside the fuel cap, wherein a rotation of the fuel cap is prevented in a state in which the coupling rod is engaged on the catching groove and the rotation of the fuel cap is possible in a state in which the coupling rod is disengaged from the catching groove.

2. The fuel cap system of claim 1, further comprising an internal guide disposed in the shaft direction of the fuel cap and configured to guide a movement of the plunger inside the fuel cap.

3. The fuel cap system of claim 1, further comprising an elastic member disposed to surround an exterior circumference of the sliding rod, wherein the elastic member is configured to provide an elastic force for the coupling rod to be engaged on the catching groove.

4. The fuel cap system of claim 1, wherein the fuel cap comprises:
    a cap part having a hollow interior such that the solenoid may be press-fitted; and
    a retainer screwed to the filler neck at a bottom of the fuel cap.

5. The fuel cap system of claim 4, further comprising a stopper disposed inside the retainer and configured to control a range of movement of the plunger.

6. The fuel cap system of claim 1, wherein
    the speed sensor is configured to transmit the speed to the controller.

7. The fuel cap system of claim 1, wherein the coupling rod comprises:
    a coupling part coupled with the plunger; and
    a catching part engaged on the catching groove.

8. The fuel cap system of claim 7, wherein a gap is defined between the catching groove and the catching part.

9. The fuel cap system of claim 8, wherein the interior circumference of the inner ring has a chamfered structure configured to allow the coupling rod to be easily seated in the catching groove and detached from the catching groove.

10. The fuel cap system of claim 1, further comprising:
    a protruded part disposed on an exterior circumference of the sliding rod and configured to enable teeth-engagement of the sliding rod and the plunger; and
    a coupling groove disposed on an interior circumference of the plunger, wherein the protruded part is coupled to the coupling groove.

11. A vehicle comprising:
    a fuel pipe disposed within a vehicle body;
    a filler neck connected to the fuel pipe;
    a fuel cap having a cylindrical shape with an opened lower surface and configured to be coupled to the filler neck by rotation;
    a controller configured to control opening or closing of the fuel cap by a signal input through a refueling button;
    a speed sensor, wherein the controller is configured to determine whether the vehicle is in a stationary state based on a speed detected by the speed sensor;
    a vehicle battery;
    a wire coupling the vehicle battery with the fuel cap, the vehicle battery able to apply a current to the fuel cap through the wire according to the signal from the controller;
    a sliding rod extending from an upper surface of the fuel cap in a shaft direction at an inside of the fuel cap and configured to rotate together with the fuel cap;
    a plunger comprising an upper end slidably coupled to the sliding rod in the shaft direction and a lower end comprising a coupling rod;

an inner ring provided on the filler neck and comprising a catching groove having an interior circumference on which the coupling rod is configured to be selectively engaged; and a solenoid configured to separate the coupling rod from the catching groove by applying a force to the plunger in response to application of the current inside the fuel cap, wherein a rotation of the fuel cap is prevented in a state in which the coupling rod is engaged on the catching groove and the rotation of the fuel cap is possible in a state in which the coupling rod is disengaged from the catching groove.

12. The vehicle of claim 11, further comprising:

an internal guide disposed in the shaft direction of the fuel cap and configured to guide a movement of the plunger inside the fuel cap; and an elastic member disposed to surround an exterior circumference of the sliding rod, wherein the elastic member is configured to provide an elastic force for the coupling rod to be engaged on the catching groove.

13. The vehicle of claim 12, wherein the fuel cap comprises:

a cap part having a hollow interior such that the solenoid may be press-fitted;

a retainer screwed to the filler neck at a bottom of the fuel cap; and a stopper disposed inside the retainer and configured to control a range of the movement of the plunger.

14. The vehicle of claim 11, wherein the coupling rod comprises:

a coupling part coupled with the plunger; and a catching part caught on the catching groove;

wherein a gap is defined between the catching groove and the catching part; and wherein the interior circumference of the inner ring has a chamfered structure configured to allow the coupling rod to be easily seated in the catching groove and detached from the catching groove.

15. The vehicle of claim 11, further comprising:

a protruded part disposed on an exterior circumference of the sliding rod and configured to enable teeth-engagement of the sliding rod and the plunger; and a coupling groove disposed on an interior circumference of the plunger, wherein the protruded part is coupled to the coupling groove.

16. A method of controlling the fuel cap system of claim 1, the method comprising:

determining a vehicle is in a stationary state;

transmitting the signal input through the refueling button; and applying the current from the vehicle battery to the solenoid inside the fuel cap.

17. The method of claim 16, further comprising moving the plunger inside the fuel cap in the shaft direction by magnetic force generated by the solenoid in response to applying the current.

18. The method of claim 17, further comprising:

moving the coupling rod connected to the plunger and coupled to the filler neck of the fuel pipe together with the plunger; and separating the coupling rod from the catching groove of the inner ring provided on the filler neck.

19. The method of claim 18, further comprising:

determining the stationary state of the vehicle is released; and blocking the current applied to the solenoid.

20. The method of claim 19, further comprising re-coupling the coupling rod with the filler neck while the coupling rod returns to an original position when the current is blocked.

* * * * *